(12) United States Patent
Saito

(10) Patent No.: US 6,963,417 B1
(45) Date of Patent: Nov. 8, 2005

(54) INTERNET FACSIMILE APPARATUS AND INTERNET TRANSMITTING APPARATUS

(75) Inventor: Kyoji Saito, Kawasaki (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 0 days.

(21) Appl. No.: 09/565,470

(22) Filed: May 5, 2000

(30) Foreign Application Priority Data

Oct. 5, 1999 (JP) .......................................... 11-283877

(51) Int. Cl.$^7$ .......................... G06F 15/00; G06F 15/16; H04N 1/00
(52) U.S. Cl. ...................... 358/1.15; 358/402; 358/403; 709/206
(58) Field of Search ................................ 709/206, 207; 358/402, 403, 1.15, 1.16, 405, 440; 379/88.13, 88.14, 88.18

(56) References Cited

U.S. PATENT DOCUMENTS

| | | | |
|---|---|---|---|
| 5,734,901 A | | 3/1998 | Sidhu et al. |
| 5,805,298 A | * | 9/1998 | Ho et al. ..................... 358/402 |
| 5,881,233 A | | 3/1999 | Toyoda et al. |
| 6,025,931 A | * | 2/2000 | Bloomfield ................. 358/402 |
| 6,094,277 A | | 7/2000 | Toyoda |
| 6,097,797 A | * | 8/2000 | Oseto ..................... 379/100.08 |
| 6,249,807 B1 | * | 6/2001 | Shaw et al. .................. 709/206 |
| 6,272,532 B1 | * | 8/2001 | Feinleib ....................... 709/206 |
| 6,470,379 B1 | * | 10/2002 | Mori ........................... 709/206 |
| 6,535,303 B1 | * | 3/2003 | Wolf ........................... 358/434 |

FOREIGN PATENT DOCUMENTS

| | | |
|---|---|---|
| JP | 6-152917 | 5/1994 |
| JP | 7-250191 | 9/1995 |
| JP | 11-168614 | 6/1999 |

OTHER PUBLICATIONS

English Language Abstract of JP 11–168614.
English Language Abstract of JP 6–152917.
English Language Abstract of JP 7–250191.

* cited by examiner

*Primary Examiner*—Edward Coles
*Assistant Examiner*—Chan S. Park
(74) *Attorney, Agent, or Firm*—Greenblum & Bernstein, P.L.C.

(57) ABSTRACT

A plurality of destination mail addresses for broadcast transmission input from a panel control section is temporarily stored in an address data buffer. An address reading control section reads the destination mail addresses from the address data buffer in order to divide the plurality of destination mail addresses to a plurality of groups in unit of setting value M. A mail creating section creates e-mail directing to a destination mail address belonging to each group. This makes it possible to limit the number of destination mail addresses, which is input to a destination filed [To:] of one e-mail, to the setting value M. Also, this makes it possible to prevent a header portion from being needlessly increased at the time of broadcast transmission.

8 Claims, 7 Drawing Sheets

| No. | ADDRESS | CLASSIFICATION |
|---|---|---|
| 1 | A0@BB.CO.JP | A |
| 2 | B0@DD.CO.JP | B |
| 3 | A1@DD.CO.JP | A |
| 4 | A2@DD.CO.JP | A |
| 5 | B1@DD.CO.JP | B |

| No. | ADDRESS | CLASSIFICATION |
| --- | --- | --- |
| 1 | A0@BB.CO.JP | A |
| 2 | B0@DD.CO.JP | B |
| 3 | A1@DD.CO.JP | A |
| 4 | A2@DD.CO.JP | A |
| 5 | B1@DD.CO.JP | B |

FIG. 7

INTERNET FACSIMILE APPARATUS AND INTERNET TRANSMITTING APPARATUS

BACKGROUND OF THE INVENTION

1. Field of the Invention

The present invention relates to an Internet facsimile apparatus and its method for transmitting image data using e-mail via a computer network such as Internet.

2. Description of the Related Art

There is conventionally proposed an Internet facsimile apparatus (hereinafter referred to as IFAX) as disclosed in Unexamined Japanese Patent Publication No. HEI8-242326 and the corresponding U.S. Pat. No. 5,881,233. An IFAX operator of a transmitting side places an original on a document plate and inputs a destination mail address from a panel control section, and depresses a start button at a transmitting time. Then, the IFAX scans each page of the original by use of a scanner, and obtains a plurality of image data. The IFAX converts these image data to e-mail, and transmit this e-mail to an IFAX of a receiving side. The IFAX of the receiving side inverse converts e-mail to image data, and prints these image data by a printer. Thus, the IFAX implements the transmission of information of paper document to a communication partner on the Internet in a manner similar to the general facsimile apparatus. At this time, a header of e-mail and a character string of a text portion are converted to image data, and printed together with image data.

The IFAX can perform the so-called broadcast transmission in which e-mail is transmitted to a plurality of destination addresses simultaneously. At this time, the IFAX arranges all addresses of broadcast transmission onto a destination field [To:] of the header of e-mail. The IFAX of the receiving side prints the header of e-mail as mentioned above. Then, if the number of addresses are extremely large (for example, more than 100), the header portions are printed more than the images and text portions, causing waste of recording papers.

Moreover, if e-mail in which all addresses of broadcast transmission are included in the destination field [To:] is sent, mail addresses of the other broadcast destination is reported to a communication partner, and this induces leakage of personal data.

SUMMARY OF THE INVENTION

It an object of the present invention is to provide an IFAX capable of preventing a header portion from being needlessly increased at the time of broadcast transmission, and to provide an Internet facsimile transmitting method.

In order to archive the above-mentioned object, according to the present invention, a plurality of destination mail addresses for the broadcast transmission is divided into a plurality of groups, and e-mail is created per plurality of groups, and thus created e-mail is transmitted.

This makes it possible to reduce the number of destination mail addresses included in the header of one e-mail, so that occurrence of a case in which the header portion is needlessly increased can be prevented in advance when the header is printed by the IFAX of the receiving side.

According to the present invention, when the plurality of destination mail addresses is input, the plurality of destination mail addresses is divided into the plurality of groups, and an e-mail message is created for each group, and thus created e-mail is transmitted.

This makes it possible to reduce the number of destination mail addresses included in the header of one e-mail. As a result, when the header is printed by the IFAX of the receiving side, occurrence of the case in which the header portion is printed more than the images and text portion can be prevented, and the waste of recording papers can be eliminated.

Moreover, according to the present invention, when the plurality of destination mail addresses is input, the destination mail addresses are divided into the plurality of groups, and e-mail is created per plurality of groups, and thus created e-mail is transmitted. This makes it to limit the destination mail addresses included in the header of one e-mail to the same group. As a result, the destination mail addresses of the other group are prevented from being reported to the receiving side.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 7 is a view showing one example of group information in the Internet facsimile apparatus according to the second embodiment.

DETAILED DESCRIPTION OF THE PREFERRED EMBODIMENTS

The following will specifically explain first and second embodiments with reference to the acclassificationing drawings herewith.

First Embodiment

Figure 1:
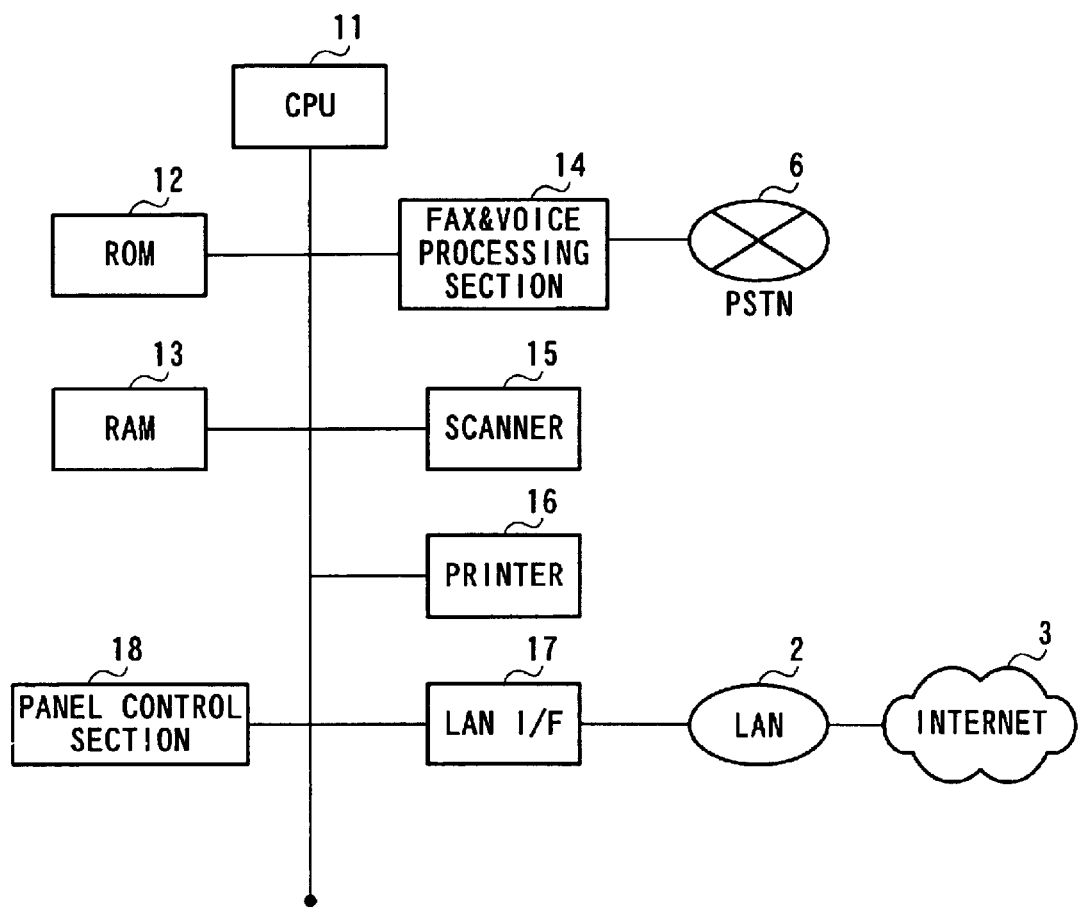
FIG. 1 is a block diagram showing hardware of an Internet facsimile apparatus according to a first embodiment of the present invention.

Firstly, the first embodiment of the present invention will be explained. FIG. 1 is a block diagram showing hardware of an IFAX according to the first embodiment of the present invention. A CPU 11 executes a program, and performs control of the entirety of the apparatus. A ROM 12 stores the program, which is executed by the CPU 11.

The RAM 13 has a work area where the program is executed and a buffer area where data of various kinds such as e-mail data and an image file, and the like is temporarily stored.

A FAX & voice processing section 14 modulates facsimile data and a voice and outputs modulated data to a PSTN 6, and demodulates modulated data received from the PSTN 6 to facsimile data and voice data.

A scanner 15 scans an original, and obtains image data. A printer 16 prints various kinds of data including image data received.

A LAN interface 17 executes a protocol necessary for transmitting and receiving data on the LAN 2 and/or the Internet 3.

A panel control section 18 comprises dial keys and a touch panel, and receives operations such as a specification of a communication partner, an instruction of a transmission start, etc., which are executed by an operator.

Figure 2:
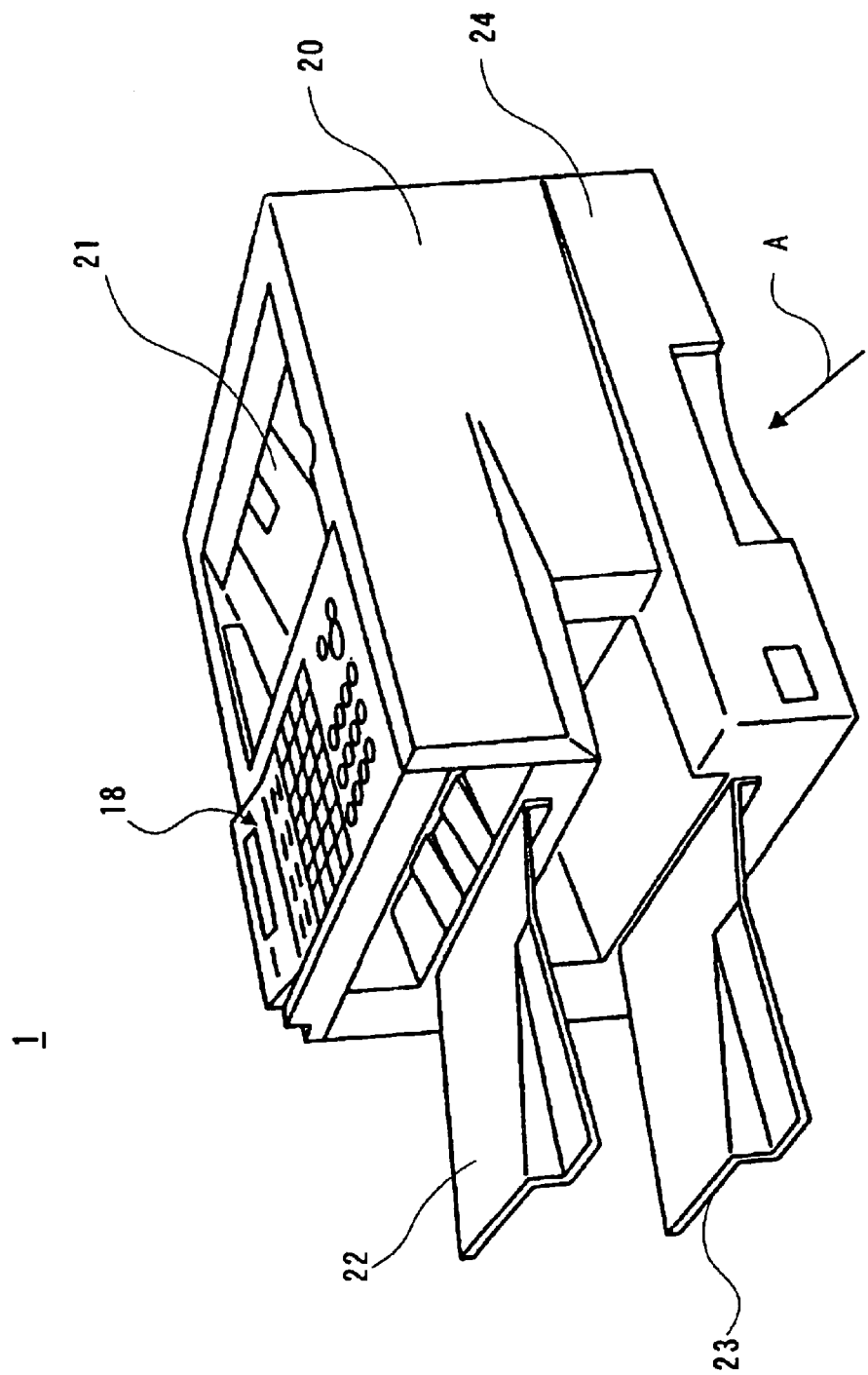
FIG. 2 is a perspective view showing an outline of the Internet facsimile apparatus according to the first embodiment.

FIG. 2 is a perspective view showing an outline of the IFAX according to the first embodiment. The following will explain a case in which an IFAX 1 is seen from a direction shown by an arrow A of FIG. 2.

In the IFAX 1, the scanner 15 and the printer 16 are incorporated into a housing 20 together with other structural elements, that is, CPU 11, ROM 12, RAM 13, FAX & voice processing section 14, LAN interface 17, and panel control processing section 18. The panel control section 18 is provided at the left surface side, which is an upper surface portion of the IFAX 1. A document plate 21 for supplying an original to scanner 15 is provided at the right side of the panel control section 18. Paper discharge trays 22 and 23 for receiving printed materials discharged from the printer 16 are vertically provided at the left side surface portion of the IFAX 1. A paper feeder section 24 for feeding printing paper to the printer 16 is provided at a bottom surface portion of the IFAX 1.

Figure 3:
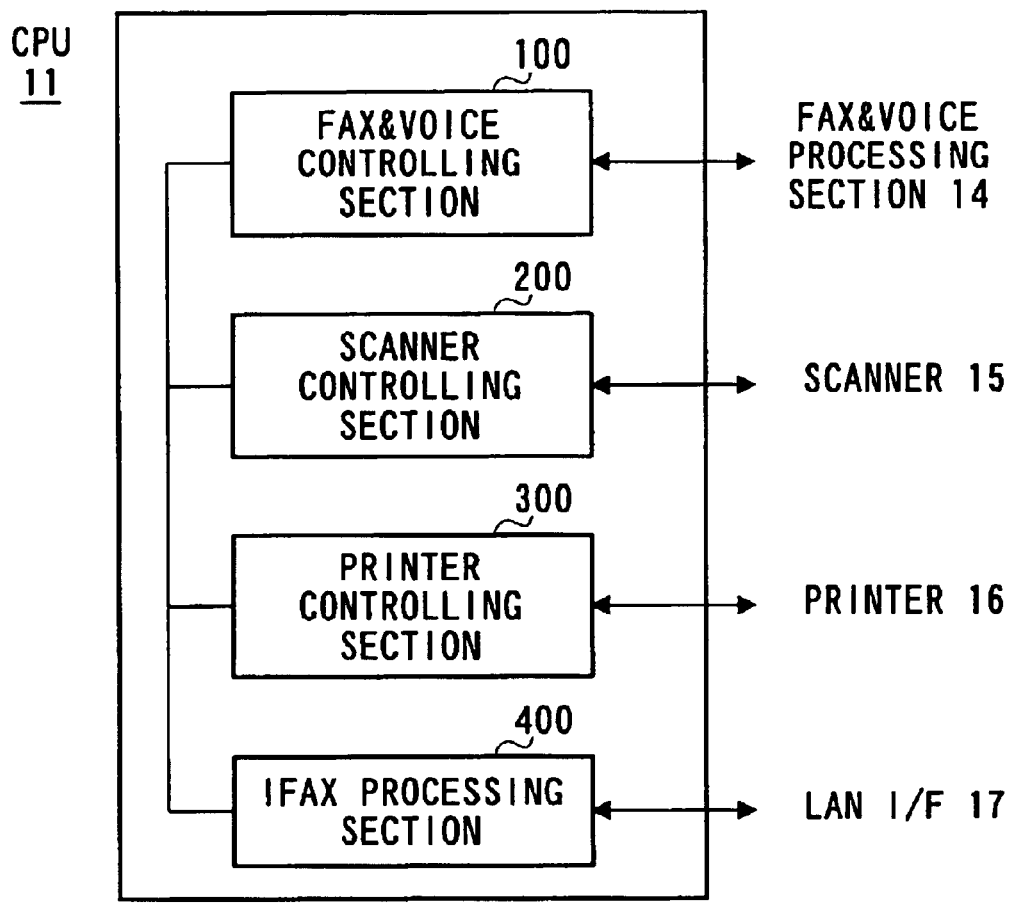
FIG. 3 is a block diagram showing a function of the Internet facsimile apparatus according to the first embodiment.

As mentioned above, the ROM 12 stores the program, and the CPU 11 executes the program. The functions, which are resultantly implemented, are explained as follows. FIG. 3 is a block diagram showing the functions of the IFAX according to the first embodiment.

The IFAX 1 comprises a FAX & voice controlling section 100, a scanner controlling section 200, and a printer controlling section 300 to control each processing section of the FAX & voice processing section 14, the scanner 15, and the printer 16.

The IFAX 1 also comprises an IFAX processing section 400, which implements the function as IFAX. This IFAX processing section 400 transmits and receives e-mail via the LAN 2 and/or the Internet 3 by use of the LAN interface 17. In other words, the IFAX processing section 400 receives e-mail from a sender, and prints received data by use of the printer 16. At this time, if an image file is appended to e-mail, the content of the image file is printed by the printer 16. While, the IFAX processing section 400 converts image data obtained by the scanner 15 to e-mail, and transmits it.

Figure 4:
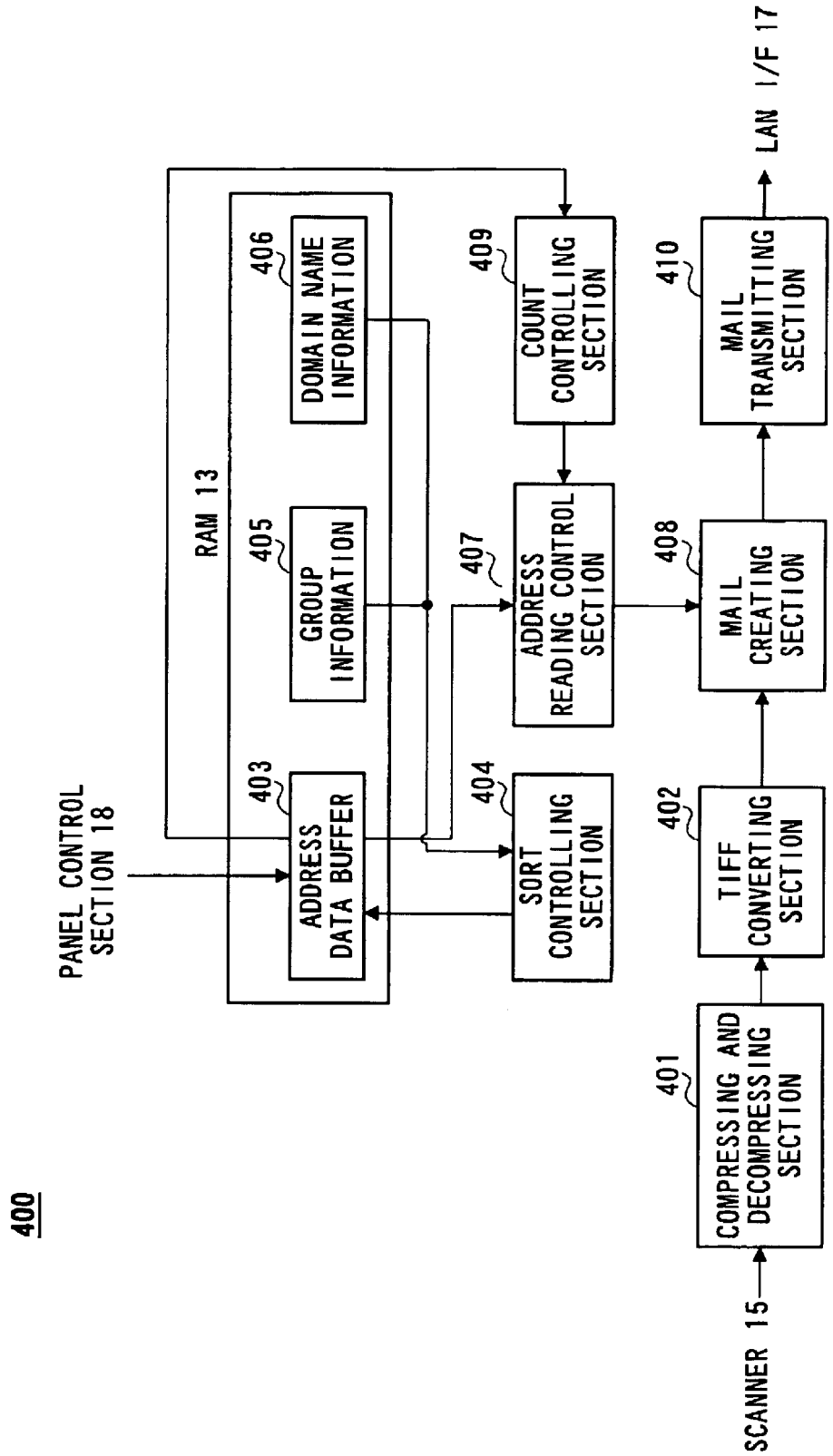
FIG. 4 is a functional block diagram showing an IFAX processing section of the Internet facsimile apparatus according to the first embodiment.

FIG. 4 is a perspective view showing an outline of the IFAX according to the first embodiment.

The scanner controlling section 200 shown in FIG. 3 sends raw image data (for example, bit map data) scanned by the scanner 16 to an IFAX processing section 400. In the IFAX processing section 400, a compressing and decompressing section 401 compresses raw image data in a compression format such as HM, MR, MMR, etc., and obtains compressed files. The compression is performed in unit of one page of the original. A TIFF converting section 402 converts these compressed files to one ITFF (Tagged Image File Format) file.

While, the plurality of destination mail addresses input from the panel control section 18 by the operator, that is, plurality of destination mail addresses (hereinafter referred to as broadcast addresses) are sent to an address data buffer 403 of the RAM 13 from the panel control section 18. A sort controlling section 404 sorts the plurality of destination mail addresses stored in the address data buffer 403. The sort control section 404 performs this sorting in accordance with group information 405 and a domain name information 406, which are stored in the RAM 13.

An address reading control section 407 reads a specific number of destination mail addresses from the address data buffer 403, and sends them to a mail creating section 408. A count controlling section 409 counts the number of destination mail addresses (hereinafter referred to as read address number) read from the address data buffer 403. The address reading control section 407 reads the destination mail addresses from the address data buffer 403 until the read address number counted by the count controlling section 409 reaches a predetermined number, and sends the destination mail addresses to the mail creating section 408. In other words, in a case where the destination mail address are large in number (more than the predetermined number), the address reading control section 407 divides these destination mail addresses into some groups in unit of a predetermined number (for example, 5, 10, etc.), and sends the plurality of destination mail addresses to the mail creating section 408 per group.

The mail creating section 408 creates e-mail directing toward the destination mail addresses received from the address reading control section 407. More specifically, the mail creating section 408 inputs these destination mail addresses to the destination field [To:] of the header portion of e-mail. Also, the mail creating section 408 appends the TIFF file sent from the TIFF converting section 402 to an append data section of e-mail in accordance with, for example, MIME (Multipurpose Internet Mail Extension), and creates e-mail. Moreover, the IFAX processing section 400 can convert facsimile data received by the FAX & voice processing section 14 to e-mail. In other words, compressed files received as facsimile data is converted to the TIFF file, and this TIFF file is appended to e-mail, and e-mail is created.

Therefore, the mail creating section 408 creates one e-mail every time when receiving the plurality of destination mail addresses from the address reading control section 407, whereby the mail creating section 408 creates e-mail every one group of destination mail address.

While, in the IFAX processing section 400, when a mail receiving section receives e-mail via the LAN interface 17, a binary converting section converts the appended file included in e-mail to binary data from a text code so as to obtain a TIFF file. A TIFF opening section opens the obtained TIFF file so as to obtain a compressed file. The compressing and decompressing section 401 decompresses this compressed file so as to obtain raw image data. This raw image data is printed by the printer 16.

Figure 5:
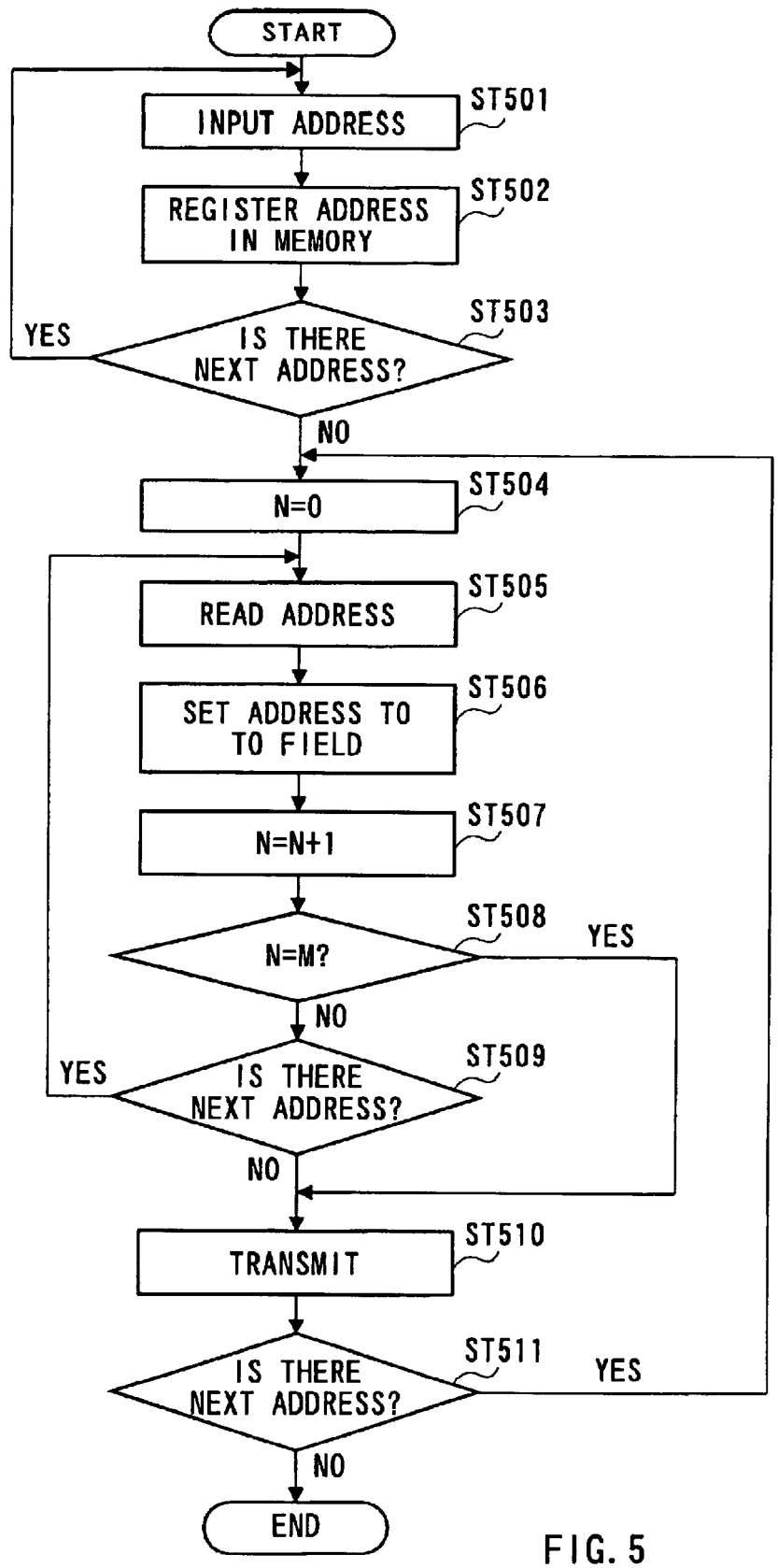
FIG. 5 is a flowchart showing an e-mail transmitting operation of the Internet facsimile apparatus according to the first embodiment.

Next, an explanation will be given of a case in which e-mail is transmitted in the IFAX according to the first embodiment. FIG. 5 is a flowchart showing an e-mail transmitting operation of the IFAX according to the first embodiment of the present invention.

First of all, a predetermined number of destination mail addresses (hereinafter referred to as setting value) M to be input to one e-mail is set in advance. This setting value M may be set to a fixed value in the IFAX, or a value which an operator can arbitrarily set. Also, the operator may arbitrarily select the setting value N from the number of values set in advance in the IFAX.

In step (hereinafter referred to as ST) 501, a destination mail address is input in the panel control section 18. The destination mail address may be input using keys of alphabets, numerals, and marks one by one from the panel control section 18, or a registered destination mail address may be input using a one-touch key at one time.

Next, in ST502, the destination mail address is registered in the address buffer 403. In ST503, it is checked whether or not there is an input of a next address. This is determined by whether the operator depresses the set key of the panel control section or the start key after inputting the destination mail address. More specifically, in a case where the operator depresses the set key, it is determined that there is an input of a next address. While, in a case where the operator does not depress the set key, it is determined that there is no input of a next address.

In the case where there is the input of next address in ST503, the operation goes back to ST501, the operations of ST501 to ST503 are repeated. While, in the case where there is no input of next address in ST503, that is, input of all broadcast addresses is ended, the count controlling section 409 resets the number of read addresses N in ST504. Next, in ST505, the address reading control section 407 reads one destination mail address from the address data buffer 403, and sends it to the mail creating section 408.

In ST506, the mail creating section 408 inputs the destination mail address received from the address reading control section 407 to the destination field [To:] of the header of e-mail.

Thereafter, in ST507, the count controlling section 409 increments the number of read addresses N by 1. Next, in ST508, the address reading control section 407 checks whether or not the number of read addresses N and the setting value M match each other. If they do not match, it is checked whether or not there is a next address in ST509. If there is the next address, the operation goes back to ST505, the operations of ST505 to ST509 are repeated until the number of read addresses N and the setting value M match each other. Whereby, M destination mail addresses are input to the destination field [To:].

If the number of read addresses N and the setting value M match each other in ST508, the mail transmitting section 410 transmits e-mail in ST510. The same can be applied to the case in which there is no next address in ST509.

After transmitting e-mail in ST511, it is checked whether or not there is a next address in ST511. If there is a next address, the operation goes back to ST504, the operations of ST504 to ST510 are repeated.

According to the above-mentioned flow, the plurality of destination mail addresses for the broadcast transmission is input from the panel control section 18. The plurality of destination mail addresses is divided into the plurality of groups in unit of setting value M. Example, if one hundred destination mail addresses are input and the setting value M is 25, these destination mail addresses are divide to four groups. Thereafter, one e-mail message is created for each group. In other words, e-mail messages as many as groups are copied. Each e-mail message contains the destination mail addresses belonging to the respective groups as a destination. Thus, in the above case, four e-mail messages are created. These e-mail messages are transmitted to a mail server, and, as a result, delivered to the plurality of destination mail addressees by the mail server. This makes it possible to limit the number of destination mail addresses, which is to be input to the destination field [To:] of one e-mail, to the setting value M. As a result, when e-mail is printed by the IFAX of the receiving side, occurrence of the case in which the header portion is printed more than the images and the text portions can be prevented, and the waste of recording papers can be eliminated.

In the first embodiment, it should be noted that the sort controlling section 404 may sort the destination mail addresses in accordance with the group information 405 and domain name information 406 after all destination mail addresses are input by the panel control section 18.

Second Embodiment

Next, the second embodiment of the present invention will be explained. The IFAX according to the second embodiment has the same hardware configuration as that of the first embodiment shown in FIGS. 1 to 4, and substantially the same function as that thereof, and the explanation is given with reference to these figures.

In the second embodiment, the count controlling section 409 counts the number of destination mail addresses (hereinafter referred to as the number of broadcast addresses) input to the address data buffer 403 from the panel control section 18. If the number of destination mail addresses read from the address data buffer 403, that is, the number of read address numbers is the same as that of the number of broadcast addresses, the address reading control section 407 reads all destination mail addresses and determines that they are sent to the mail creating section 408.

Figure 6:
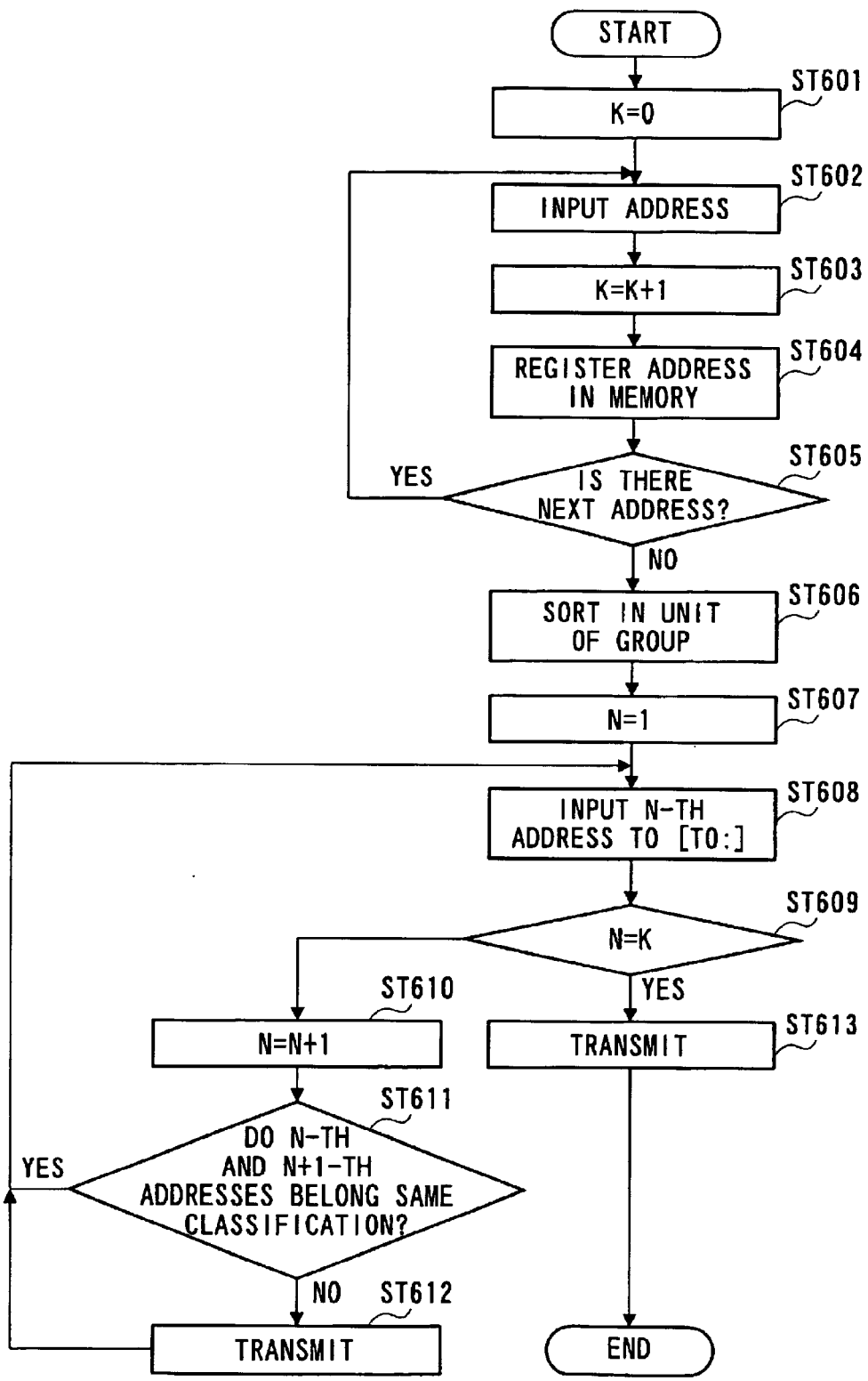
FIG. 6 is a flowchart showing an e-mail transmitting operation of the Internet facsimile apparatus according to a second embodiment of the present invention.

FIG. 6 is a flowchart showing an e-mail transmitting operation of the IFAX according to the second embodiment of the present invention. In ST601, the count controlling section 409 resets the number of broadcast addresses K. Next, in ST602, the destination mail address is input to the panel control section 18. Next, in ST603, the count controlling section 409 increments the number of broadcast addresses K by 1. Next, in ST604, the destination mail address is registered in the address data buffer 403. Then, in ST605, it is checked whether or not there is an input of a next address. This check is performed as in the case of ST503 shown in FIG. 5 explained in the first embodiment. If there is an input of a next address in ST605, the operation goes back to ST602, and the operations of ST602 to ST605 are repeated. While, if there is no input of a next address in ST605, that is, inputs of all broadcast addresses are ended, the sort controlling section 404 sorts the destination mail addresses stored in the address data buffer 403 in ST606. In this example, the sort controlling section 404 sorts the destination mail addresses in accordance with classification information as shown in FIG. 7.

Thereafter, the count control section 409 sets the number of read addresses N to 1 in ST607. Next, in ST 608, the address reading control section 407 reads an N-th destination mail address from the address data buffer 403, and sends it to the mail creating section 408. The mail creating section 408 inputs the destination mail address received from the address reading control section 407 to the destination field [To:] of the header of e-mail.

Next, in ST 609, the address reading control section 407 checks whether or not the number of read addresses N and the number of broadcast addresses K match each other. If they do not match in this step, that is, the read destination mail address is not the last destination mail address, the count controlling section 409 increments the number of read addresses N by 1 in ST 610.

Next, in ST611, the address reading control section 407 checks whether or not the classification of the N-th destination mail address and the classification of N+1-th are the same as each other. If both are the same as each other, the operation goes back to ST608, and the operations of ST608 to ST611 are repeated. While, if they are not the same in ST611, the mail transmitting section 410 transmits e-mail in ST612. After transmitting e-mail, the operation goes back to ST608, the operations of ST608 to ST611 are repeated.

By the operations so far, the destination mail addresses of the same classification are input to the destination field [To:] of one e-mail. If the classification is changed, e-mail in which the destination mail addresses so far are input to the destination field [To:] is sent.

If the number of read addresses N and the number of broadcast addresses K match each other in ST 609, that is, the read destination mail address is the last destination mail address, the mail transmitting section 410 transmits e-mail in ST 613, and the processing is ended.

According to the above-mentioned flow, the plurality of destination mail addresses of the broadcast transmission input from the panel control section 18 is once stored in the address data buffer 403. Thereafter, one e-mail message is created in unit of one classification. In other words, e-mail messages as many as classifications are copied. Each e-mail message contains the destination mail addresses belonging to the respective classifications as a destination. Thus, in this case, two e-mail messages are created. These e-mail messages are transmitted to a mail server, and, as a result, delivered to the plurality of destination mail addressees by the mail server. This makes it possible to limit the number of destination mail addresses, which is to be input to the destination field [To:] of one e-mail, to the same classification. As a result, the destination mail addresses of the other classifications are not included in the head portion when e-mail is printed by the IFAX of the receiving side. This makes it possible to protect the secrets of destination mail addresses of the other classifications and to prevent the leakage of personal information.

In the above-mentioned second embodiment, the plurality of destination mail addresses is sorted in accordance with the classification information 405 stored in the RAM 13, and the destination mail addresses are divided into the plurality of groups in unit of one classification. However, the plurality of destination mail addresses is sorted in accordance with the domain name information 406 stored in the RAM 13 in a like manner, and the destination mail addresses are divided into the plurality of groups every destination mail address having the same domain name. This makes it possible to limit the number of destination mail addresses, which is to be input to the destination field [To:] of one e-mail, to the destination mail addresses having the same domain name. As a result, the destination mail addresses having the other domain are not included in the head portion when e-mail is printed by the IFAX of the receiving side. This makes it possible to protect the secrets of destination mail addresses having the other domain and to prevent the leakage of personal information.

Also, in the second embodiment, the destination mail addresses are input to one e-mail regardless of the number of destination mail addresses. However, as explained in the first embodiment, the destination mail addresses belonging to the same classification are further divided into the groups every the setting value M, and e-mail can be created every the divided group and transmitted. In this case, similar to the first embodiment, it is possible to limit the number of destination mail addresses, which is input to the destination field [To:] of one e-mail, to the setting value M. As a result, occurrence of the case in which the header portion is printed more than the images and the text portions can be prevented and the waste of recording papers can be eliminated when the header is printed by the IFAX of the receiving side in a state in which the number of destination mail addresses belonging to one classification is large.

The present invention is not limited to the aforementioned first and second embodiments. For example, in the first and second embodiments, the destination mail addresses are input to the destination field [To:] of the header of e-mail, but they may be input to a broadcast destination field [Cc:] or a secret broadcast destination field [Bcc:].

This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software are. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMS, RAMs. EPROMs, EEPROMS, magnetic or optical cards, or any type of media suitable for storing electronic instructions.

The present invention is not limited to the above described embodiments, and various variations and modifications may be possible without departing from the scope of the present invention.

This application is based on the Japanese Patent Application No. HEI11-283877 filed on Oct. 5, 1999, entire content of which is expressly incorporated by reference herein.

What is claimed is:

1. An Internet facsimile apparatus comprising:
    a control panel configured to input an e-mail address of a destination;
    a controller configured, when a plurality of the e-mail addresses are input for Internet transmission of the same image data, to:
        divide the plurality of the input e-mail addresses into a plurality of predetermined e-mail address groups;
        generate a plurality of e-mails including the divided e-mail addresses in accordance with each of the plurality of the predetermined e-mail address groups;
        convert image data into a data format for said Internet transmission;
        attach the same converted image data to the plurality of the generated e-mails; and
        transmit each said e-mail to which the same converted image data is attached, to each said destination,
    wherein a header field of each said transmitted e-mail includes the divided e-mail addresses for each respective predetermined e-mail address group of the plurality of the predetermined e-mail address groups.

2. The Internet facsimile apparatus according to claim 1, wherein the controller is configured to divide the plurality of the input e-mail addresses into each of the plurality of the predetermined e-mail address groups in accordance with a respective predetermined number of e-mail addresses.

3. The Internet facsimile apparatus according to claim 1, wherein the controller is configured to divide the plurality of the input e-mail addresses into each of the plurality of the predetermined e-mail address groups having the same domain name.

4. The Internet facsimile apparatus according to claim 1, further comprising a memory configured to store information regarding the predetermined e-mail address groups corresponding to each the e-mail address, wherein the controller is configured to divide the plurality of the input e-mail addresses into each of the plurality of the predetermined e-mail address groups, based on the information regarding the predetermined e-mail address groups stored in the memory.

5. An Internet facsimile transmission method comprising:

inputting an e-mail address of a destination;

dividing a plurality of the input mail addresses into a plurality of predetermined e-mail address groups when the plurality of the e-mail addresses are input for Internet transmission of the same image data;

generating a plurality of e-mails including the divided e-mail addresses in accordance with a each of the plurality of the predetermined e-mail address groups;

converting image data into a data format for the Internet transmission;

attaching the same converted image data to the plurality of the generated emails; and transmitting each the e-mail to which the same converted image data is attached, to each the destination, wherein a header field of each said transmitted e-mail includes the divided e-mail addresses for each respective predetermined e-mail address group of the plurality of the predetermnined e-mail address groups.

6. The Internet facsimile transmission method according to claim 5, wherein the plurality of the input e-mail addresses are divided into each of the plurality of the predetermined e-mail address groups in accordance with a respective predetermined number of e-mail address.

7. The Internet facsimile transmission method according to claim 5, wherein the plurality of the input e-mail addresses are divided into each of the plurality of the predetermined e-mail address groups having the same domain name.

8. The Internet facsimile transmission method according to claim 5, further comprising storing information regarding the predetermined e-mail address groups corresponding to each the e-mail address, wherein the plurality of the input e-mail addresses are divided into each of the plurality of the predetermined e-mail groups, based on the stored information regarding the predetermined e-mail address groups.

* * * * *